J. R. TETERS.
RAT KILLER.
APPLICATION FILED JUNE 19, 1919.

1,408,658.

Patented Mar. 7, 1922.

INVENTOR.
JOHN R. TETERS.
BY A.B. Bowman
ATTORNEY

UNITED STATES PATENT OFFICE.

JOHN R. TETERS, OF SUNNYSIDE, CALIFORNIA.

RAT KILLER.

1,408,658. Specification of Letters Patent. Patented Mar. 7, 1922.

Application filed June 19, 1919. Serial No. 305,337.

*To all whom it may concern:*

Be it known that I, JOHN R. TETERS, a citizen of the United States, residing at Sunnyside, in the county of San Diego and State of California, have invented a certain new and useful Rat Killer, of which the following is a specification.

My invention relates to a device for killing rats and the objects of my invention are: first, to provide a device for killing rats by the use of which a large number of rats may be killed one after another without giving the device any attention; second, to provide a device of this class which is automatic in its action and operated by the rat; third, to provide a device of this class in which the rats are thrown some distance from the device by said device so that their presence will not intimidate other rats and fourth, to provide a device of this class which is very simple and economical of construction, durable, easy to set for action and which will not readily deteriorate or get out of order.

Figure 1:
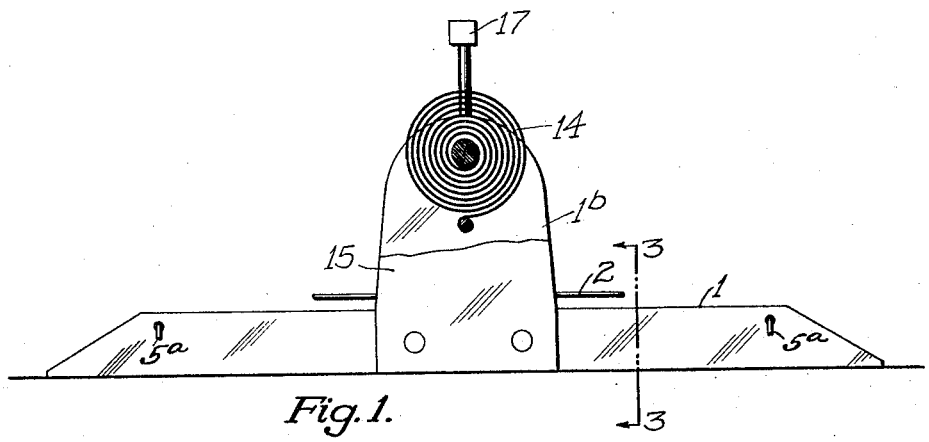
Figure 2:
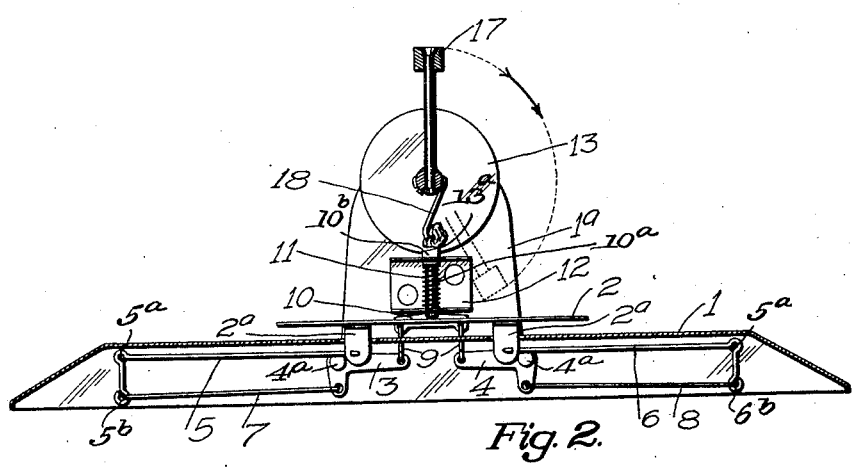
Figure 3:
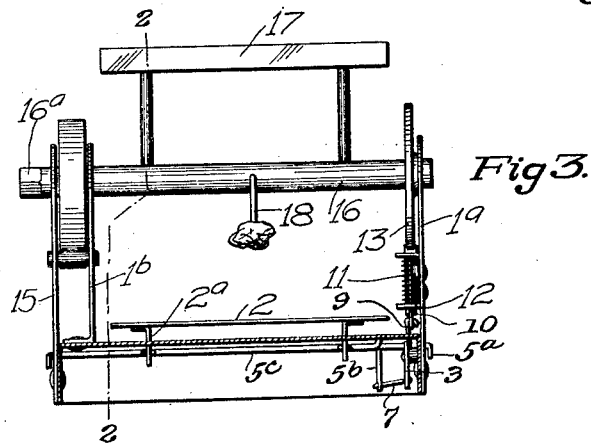

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of the device complete showing a portion broken away in section to facilitate the illustration; Fig. 2 is a longitudinal sectional view through 2—2 of Fig. 3 and Fig. 3 is a sectional view through 3—3 of Fig. 1.

Similar characters of reference refer to similar parts and portions throughout the several views of the drawings.

The base member 1, trip platform 2, bell cranks 3 and 4, bell cranks 5 and 6, rods 7 and 8, links 9, trip member 10, spring 11, trip support 12, disc 13, spring 14, support 15, shaft 16, weight 17 and bait support 18 constitute the principal parts and portions of my rat killing device.

The base member 1 is shaped as shown best in the drawings preferably made of sheet metal and pivotally mounted therein are the bell crank members 3 and 4, on pivots $4^a$, the one member of which is connected with the links 9 and the other members connect with the rods 7 and 8, the opposite ends of which connect with the portions $5^b$ and $6^b$ of the bell crank members 5 and 6. These bell crank members are mounted on cross supports $5^a$ and the other members 5 and 6 of said bell cranks are provided with right angle turns $5^c$ which extend transversely and are pivotally connected with downwardly extending lugs $2^a$ on the trip platform 2 which extend through slots in the base member 1. Secured to the opposite sides of the base member 1 are upwardly extending, vertical supports $1^a$ and $1^b$. Secured to the support $1^a$ is the trip support 12 provided with extending lugs in which is mounted the trip member 10. This trip member 10 consists of a vertical portion $10^a$ reciprocably mounted in the support 12 and provided with a latch portion $10^b$ which is adapted to engage a notch $13^a$ in the disc 13 and it connects at its lower end with the links 9 and mounted between the lower lug of the support 12 and a shoulder on the trip member 10 is the spring 11 tending to hold said trip member upwardly at all times as shown best in Fig. 2 of the drawings. Revolubly mounted in the upper portion of the supports $1^a$ and $1^b$ and 15 is a shaft 16 which is provided with a suspended weight 17 on one side and with a bait support 18 on the opposite side. Secured to said shaft 16 and adapted to engage the trip member 10 is a disc member 13 which is provided with an angular notch adapted to be engaged by the trip member 10 when in certain position relatively thereto. It being noted that the notch in the member 13 is oppositely disposed on the shaft to the weight 17 so that when the notch is engaged by the trip member 10 the weight 17 is in an upright position from said shaft. Secured to the shaft 16 adjacent the support $1^b$ is the inner end of a coil spring 13 and its outer end is secured to the support $1^b$ so that when the shaft 16 is revolved in the proper direction the spring 14 is wound on said shaft between the supports $1^b$ and 15, said shaft 16 being provided with a square end $16^a$ adapted for a crank or any key member adapted to facilitate the winding of the spring.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

The operation of the device is as follows: The spring 14 is wound by turning the shaft 16 in one direction and is left in position with the trip member 10 engaging the notch in the disc 13 as shown best in Figs. 1 and 2 of the drawings, and a bait is placed on the bait holder 18. When the rat attempts to get the bait it steps on the platform 2 depressing the same together with the trip 10 operating the links 9, bell cranks 3 and 4, rods 7 and 8, bell cranks 5 and 6 and the spring thrusts the weight 17 around striking the rat and knocking him some distance, the shaft continuing to revolve until the weight 17 again reaches an upright position and the trip 10 engages the notch in the disc 13 and the device is again ready for another victim.

Having thus described my invention what I claim as new and desire to secure by Letters Patent, is:

1. A rat killing device, including a base member, a platform positioned thereover movable relatively thereto, a shaft revolubly mounted in spaced relation over said platform, a bar supported on said shaft in spaced relation thereto, a spring secured to one end of said shaft and its other end secured to said base member, a bait member supported on said shaft on the opposite side from said bar, a disk secured on said shaft at the opposite end from said spring provided with a notch in its outer edge, a spring actuated trip latch released by the movement of said platform for engaging said notch when not released by the platform whereby said shaft member is stopped with each revolution.

2. A device of the class described, including a hollow base member, a platform positioned over the middle of said base member, a spring actuated trip member positioned at one side of said platform over said base member, bell crank, lever, rod and link means connecting said platform with said spring actuated latch member whereby said latch member is depressed with the depression of said platform, a shaft revolubly mounted over said platform, a weighted bar secured to said shaft on one side and a bait support secured thereto on its opposite side, a disk secured to said shaft provided with a notch adapted to be engaged by said trip member and a spring secured to said shaft and to said base member tending to revolve said shaft.

3. A device of the class described, including a hollow base member, oppositely disposed supports secured to opposite sides of said base member and extending upwardly therefrom, a platform positioned over said base member provided with lugs extending down through the upper side thereof, a shaft revolubly mounted on said upwardly extending supports, a spring with one end secured to said shaft and its other end to one of said supports, a bar secured in spaced relation to said shaft, a bait support secured to said shaft on opposite sides from said bar, a disk provided with a notch in its edge secured on the opposite end of said shaft from said spring adjacent the other upward extending support, a spring actuated latch tending to engage the edge of said disk at all times and means connecting said platform with said spring actuating latch for releasing said latch from said disk with the movement of said platform.

In testimony whereof, I have hereunto set my hand at San Diego California this 14th day of June 1919.

JOHN R. TETERS.